United States Patent Office 3,403,166
Patented Sept. 24, 1968

3,403,166
EPISULFIDE PRODUCTION
Friedrich K. Lautenschlaeger, Toronto, Ontario, Canada, assignor to The Dunlop Company Limited, a British company
No Drawing. Filed July 23, 1965, Ser. No. 474,453
Claims priority, application Great Britain, Aug. 1, 1964, 30,410/64
15 Claims. (Cl. 260—327)

ABSTRACT OF THE DISCLOSURE

Preparation of monomeric substituted vicinal episulphides by reducing in a non-acidic reducing system a chloropolysulphide, being the reaction product of an olefine having a substituent containing at least one atom other than carbon and hydrogen with a sulphur chloride compound having a mol ratio of sulphur to chlorine of at least 0.5:1 said non-acidic reducing system being, e.g., aluminium amalgam and water, nascent hydrogen, lithium aluminum hydride, glucose in a basic medium, and sodium sulphide and/or sodium sulphite. These episulphides may be polymerized or copolymerized to form polymers and serve such uses as modifying the physical and chemical properties of polymeric materials.

---

This invention relates to a process for the preparation of monomeric sulphur-containing compounds, and to such compounds when prepared by the process.

According to the present invention a process for the preparation of a monomeric compound containing the group

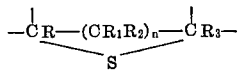

wherein each R group represents a hydrogen atom, an alkyl group, a cycloalkyl group or an aralkyl group, but wherein at least one of said R groups represents a group containing at least one atom other than carbon or hydrogen and $n$ is an integer, comprises reducing a chloropolysulphide, being the reaction product of an olefine having a substituent containing at least one atom other than carbon or hydrogen with a sulphur chloride compound having a mole ratio of sulphur to chlorine of at least 0.5:1, using a non-acidic reducing system.

The chloropolysulphide which is reduced to form the monomeric compound is obtained by reacting an olefine having a substituent containing at least one atom other than carbon or hydrogen with a sulphur chloride compound having a mole ratio of sulphur to chlorine of at least 0.5:1. It is to be understood that the sulphur in the sulphur chloride compound need not necessarily all be combined with the chlorine. For instance, a mixture of two moles of free sulphur and one mole of sulphur dichloride is regarded for the purposes of this specification as a sulphur chloride compound having a mole ratio of sulphur to chlorine of 4:2, i.e. 2:1. However, the chlorine in the sulphur chloride compound must be combined with at least some of the sulphur since free chlorine is undesirable. An example of a suitable sulphur chloride compound is sulphur monochloride. Sulphur dichloride may be used but in this case the yields of the dichloropolysulphide are low, and it is preferred to use a sulphur chloride compound having a mole ratio of sulphur to chlorine of at least 1:1, and preferably greater than 1:1.

A suitable sulphur chloride compound having a mole ratio of sulphur to chlorine of greater than 1:1 can be obtained by reacting sulphur monochloride with sulphur, for instance by refluxing a mixture of the two reagents for several days and then removing excess sulphur monochloride. The product is a mixture of sulphur chlorides some of which may have a mole ratio of sulphur to chlorine as high as 25:1. By using such a mixture the yield of the chloropolysulphide obtained can be as high as 100 percent.

The amount of sulphur chloride compound used is usually such that the mole ratio of the sulphur chloride compound when based on the average molecular weight i.e. the weight of the compound which would completely react with 2 moles of a mono-olefine so that all the available chlorine has been extracted, to the olefine is from 1:1 to 1:5, preferably from 1:2 to 1:3.5.

However, the amount of the sulphur chloride compound used when a diolefine is used is dependent to some extent upon whether it is desired to form a monoepisulphide or a diepisulphide. When it is desired to produce a diepisulphide, then the amount of the sulphur chloride compound used will usually be such that the mole ratio of the sulphur chloride compound when based on the average molecular weight to the diolefine is preferably from 1:1 to 1:2.

The product of the reaction between the olefine and the sulphur chloride compound is a mixture of a chloromonosulphide and a chloropolysulphide. It is the chloropolysulphide (usually a disulphide) which is reduced to produce an episulphide; the chloromonosulphide cannot be reduced to produce an episulphide.

The chloropolysulphide which is produced by reacting the sulphur chloride compound with the olefine can be a polymeric or monomeric dichloropolysulphide, depending upon the olefine used as starting material and the amount of the sulphur chloride compound used. When the olefine is a mono-olefine the product will be a monomeric dichloropolysulphide, but when a diolefine or a polyolefine, whether cyclic or acyclic, is used the product may be a monomeric chloropolysulphite or a polymeric form of the chloropolysulphide, depending to some extent upon the amount of the sulphur chloride compound used. The monomeric chloropolysulphide is reduced to form a monomeric compound containing a single group of the specified formula whether the original olefine was a mono-olefine or a polyolefine. The polymeric form of the dichloropolysulphide is reduced to yield a compound containing two or more of the specified groups and may be a diepisulphide or an episulphide having more than two episulphide rings, depending upon the number of double bonds in the original olefine, or it may be a polycyclic compound having a sulphur bridge. When the original olefine is a polyolefine, it is probable that the final product will be a mixture of the compound having one of the specified groups and a compound having more than one such group, the predominant product being determined by the amount of the sulphur chloride compound used and the reaction conditions.

If desired, the sulphur chloride compound can be added to the olefine in small proportions, or vice-versa. The chloropolysulphide can be prepared from a liquid olefine or a gaseous olefine and in the case where a gaseous olefine is used the olefine can be used in the form of a solution in a suitable solvent therefor such as carbon tetrachloride.

Alternatively, when a gaseous olefine is used the olefine can be added to the sulphur chloride compound or to a solution of the sulphur chloride compound in, for instance carbon tetrachloride, or the gaseous olefine can be formed into its liquid form prior to addition of the sulphur chloride compound and the reaction carried out in a sealed reaction vessel in the absence of a solvent for the olefine.

The reaction between the sulphur chloride compound and the olefine may be carried out in the presence of a catalyst which is cationic in character. Examples of catalyst which may be used are zinc chloride, aluminum trichloride, ferric chloride, boron tri-fluoride, which is normally used in the form of an etherate, and phosphorus pentachloride. If a catalyst is used the reaction is normally carried out at temperatures below room temperature, for example at temperatures between −10° C. However, when a gaseous olefine is used, temperatures of less than 100° C., e.g. 30° to 70° are used. The reaction can conveniently be carried out at the boiling point of the olefine, if this is a liquid at ordinary temperatures.

If desired, free sulphur or ethyl tetrasulphide may be added to the reaction mixture to regenerate sulphur monochloride from the sulphur dichloride formed. The amount of free sulphur or ethyl tetrasulphide added is not critical, and a large excess may be used if desired.

The reaction between the olefins and the sulphur chloride compound can be effected in the absence of solvent. Alternately the reaction can be carried out in an inert solvent such as a hydrocarbon, a chloro-substituted hydrocarbon or an ether. Examples of solvents which can be used are hexane, diethyl ether, carbon tetrachloride, and especially polar solvents such as acetonitrile and nitrobenzene. The amount of solvent used can vary considerably and is usually between 5 mls. and 50 mls. of solvent per mole of the olefine, preferably between 10 mls. and 25 mls. of solvent per mole of the olefine. However, amounts in excess of 50 mls. per mole can be used if desired.

Typical chloropolysulphides which can be reduced to form the monomeric compounds of the inventon can be prepared by reacting an olefine having a substituent containing at least one atom other than carbon or hydrogen with a sulphur chloride compound having a mole ratio of sulphur to chlorine of greater than 1:1 to form a chloropolysulphide.

The reduction of the chloropolysulphide to the monomeric compound having the specified general formula can be effected by mixing the chloropolysulphide with aluminium amalgam and adding water to the mixture. It is not necessary to isolate the chloropolysulphide prior to reducing it. This method of effecting the reduction is preferred since there is little tendency during the reduction step for the polymerization of the episulphide product to give a polyepisulphide. However, other reduction systems can be used providing care is taken to prevent the polymerization of the episulphide formed. Acidic systems should be avoided for this reason. Examples of other systems that may be used to reduce the chloropolysulphide are nascent hydrogen, glucose in a basic medium, lithium aluminium hydride and sulphides of the metals of Group I of the Mendeleeff Periodic Table. The amount of the reducing agent is not critical, e.g. from 10 percent to 25 percent by weight of aluminium amalgam based on the weight of the chloropolysulphide to be reduced. The amount of the diethyl ether in which the aluminium amalgam is suspended is not critical but will usually be from 5 mls. to 50 mls. per gms. of aluminium amalgam. The amount of the metal sulphide will usually be such that the molar ratio of the metal sulphide to the chloropolysulphide is from 1:1 to 8:1, preferably 2:1 to 6:1.

The olefines which can be used to prepare the chloropolysulphides can be mono-olefines, diolefines or polyolefines, and examples of the substituents which may be present are halogen atoms, nitrile groups, ester, ether or thioether groups, carbonyl or carboxyl groups, anhydride groups, amino or amido groups, nitro groups, phenol or phenoxy groups, and hydroxyl groups. Examples of suitable olefines are 3-haloprene, 1,4-dichloro-2-butene, allyl cyanide, 1-methylene-4-methanol acetate cyclohexane, methyl allyl thioether, tetrahydrophthalic anhydride, allylamine, allylamide, allyl nitrobenzene, allyl phenol and 2-pentene-1-ol.

The rate of reaction between the sulphur chloride compound and the olefine to form the chloropolysulphide, i.e. the rate of addition of the sulphur chloride compound to the olefine, can be increased by adding to the reaction mixture a compound which liberates free radicals such as diphenyl disulphide or butyl dithiocarbamate. Unfortunately, this results in a product containing smaller amounts of the chloropolysulphide.

It is believed that the chloromonosulphide in the reaction product is produced by a side reaction involving radicals generated during the reaction between the olefine and the sulphur chloride compound and that an increase in the amount of the chloropolysulphide produced can be obtained by adding hydroquinone to the reaction mixture.

The present invention provides a convenient and easy method for the preparation of monomeric episulphide compounds. Previous methods for preparing episulphides have been by reactions in which a thiol or an epoxide compound has been used as an intermediate.

The invention is illustrated by the following examples.

EXAMPLE I

This example illustrates the preparation of the chloropolysulphide of dichloro-2-butene, and its reduction to an episulphide.

151 gms. of trans-1,4-dichloro-2-butene and 0.1 gm. of hydroquinone were dissolved in 45 gms. of carbon tetrachloride, and 12 gms. of sulphur in 81 gms. of freshly distilled sulphur monochloride were added. The mixture was allowed to stand for five days at room temperature and was then heated at 40° C. for 1 hour, after which time 2 mls. of boron trifluoride diethyl etherate were added. The mixture was then heated under reflux for two days.

The unreacted materials were removed by distillation at atmospheric pressure, and the residue was diluted with 100 mls. of diethyl ether. The sulphur was removed by filtration and the filtrate was washed with water and dried over magnesium sulphate, after which the diethyl ether was removed by distillation. 159 gms. of a reaction product were obtained. The product contained the chloropolysulphide which was reduced by the action of 60 gms. of aluminium-amalgam and water in diethyl ether. The resulting slurry was removed by filtration and the filtrate was washed with water, dried over magnesium sulphate and distilled under vacuum to yield a mixture having a boiling range of 37 to 46° C. at a pressure of 0.5 mm. of mercury. The mixture contained cis- and trans-1,4-dichloro-2-butene episulphides, and a minor proportion of 3-4-dichloro-2-butene episulphide. The 3-4-dichloro-2-butene episulphide was identified by its desulphurization with triphenyl phosphine to yield 3-4-dichloro-butene which was identified by gas chromatography and infra-red analysis.

EXAMPLE II

This example illustrates the preparation of the chloropolysulphide of 3-chloropropylene and its reduction to the corresponding episulphide.

282 gms. of freshly distilled allyl chloride and 296 gms. of a sulphur chloride compound (average composition $S_3Cl_2$) were heated together at 35° C. to 40° C. for 5 hours, and then at 90° C. until the addition reaction was complete (as shown by a negative reaction with potassium iodide). The reaction product was decanted from the sulphur. 507 gms. of the crude reaction product were obtained.

421 gms. of the reaction product were reduced with 180 gms. of aluminium amalgam and water in tetrahydrofurane at 20° C. to 40° C. The resulting slurry was filtered and the residue washed with diethyl ether. The combined filtrates were dried over magnesium sulphate after which the mixture was distilled to yield 89 gms. of 3-chloropropylene episulphide having a boiling range of 51 to 55° C. at a pressure of 26 mms. of mercury.

EXAMPLE III

This example describes the preparation of the chloropolysulphide of 3-methoxy propene from allyl methyl ether, and its reduction to an episulphide.

Into 1908 gms. (14.1 moles) of sulphur monochloride were dissolved 922 gms. of sulphur and the solution was refluxed for 3 days and then maintained at 80° C. for a further 2 days. Excess sulphur monochloride was removed by distillation under reduced pressure (0.1 mm. mercury) at room temperature, leaving a polysulphur chloride having an average molecular weight of 250 comprising a mixture of sulphur chlorides.

86.1 gms. (1 mole) of allyl methyl ether were stirred in a clean reaction vessel at room temperature, and 125 gms. (0.5 mole) of the polysulphur chloride were added with continuous stirring. The polysulphur chloride was added at such a rate that the temperature of the reaction mixture was maintained below 35° C. The mixture was stirred for 24 hours, after which time the reaction was complete (as shown by a negative reaction with potassium iodide), and 30 gms. of amalgamated aluminium were added to reduce the beta beta'-dichloropolysulphide present in the reaction product. When reduction was complete, the mixture was distilled under reduced pressure to yield 40.2 gms. of 3-methoxy propene episulphide having a boiling point of 33–35° C. at 3 mms. Hg pressure.

The 3-methoxy propene episulphide was identified by infra-red analysis which yielded the following absorbances, which are expressed in cm.$^{-1}$. The abbreviations used are: s.=strong, m.=medium, w=weak and sh. indicates a shoulder is present.

| | |
|---|---|
| 3040 (s.) | 974 (w.) |
| 1322 (w.) | 1455 (m.) |
| 1025 (w.) | 1105 (s.) |
| 837 (m.) | 926 (w.) |
| 2935 (s.) | 1380 (s.) |
| 1266 (w.) | 1067 (s., sh.) |
| 1003 (w.) | 905 (w.) |
| 693 (m.) | 1358 (w.) |
| 1486 (w.) | 1938 (s.) |
| 1150 (s., sh.) | 870 (m.) |

The absorbances shown as 1266 cm.$^{-1}$ and 1105 cm.$^{-1}$ were broad bands.

EXAMPLE V

This example illustrates the addition of a sulphur chloride compound to an olefine bearing an ester group to yield a polysulphide compound which may be reduced to an episulphide.

To a solution of 0.1 gm. of ferric chloride in 53 gms. (0.51 mole) allyl acetate, was added 33.5 gms. of a polysulphur chloride compound at such a rate that the temperature of the solution was maintained below 35° C., with external cooling. After all the polysulphur chloride had been added, the solution was stirred for 5 hours at room temperature, after which time all of the polysulphur chloride had reacted, as was shown by a negative test with potassium iodide. The solution contained the chloropolysulphide derivative of allyl acetate as well as some irreducible monosulphide compound. The chloropolysulphide derivative was reduced to yield allyl acetate episulphide having a boiling point of 63.5–66.0° C. at six millimetres of mercury pressure, and a refractive index $n_D^{20}$=1.4822.

EXAMPLE VI

This example illustrates the reaction of a polysulphur chloride compound with an olefine bearing a nitrile group.

Into a 500 mls., 3-neck flask fitted with a stirrer, dropping funnel and thermometer, there was placed 80 gms. of 3-cyclohexene-1-carbonitrile. 67 gms. (0.35 mole) of a polysulphur chloride compound were added over a period of two hours at such a rate that the internal temperature of the mixture was maintained between 10° and 15° C. External cooling was applied. The suspension was stirred at room temperature until a negative test with potassium iodide was obtained.

The product showed the following infra-red spectrum (cm.$^{-1}$), which was that of bis-chloro-nitrilo-cyclohexyl polysulphide, which was then reduced to the episulphide.

| | |
|---|---|
| 3015 (w.) | 1260 (m.) |
| 1312 (w.). | 985 (m.) |
| 1135 (w.) | 806 (m.) |
| 887 (m.) | 1440 (s.) |
| 2945 (s.) | 1235 (w.) |
| 1292 (w.) | 939 (m.) |
| 1063 (m.) | 752 (s.) |
| 866 (m.) | 1333 (m.) |
| 2860 (m.) | 1200 (m.) |
| 1274 (m.) | 903 (m.) |
| 1010 (m.) | 718 (s.) |
| 844 (m.) | 689 (m.) |
| 2245 (m.) | |

EXAMPLE VII

This example illustrates the reduction of an addition product of a polysulphur chloride with allyl acetate.

To a solution of 0.1 gm. of ferric chloride in 53 gms. of allyl acetate was added 35.5 gms. of a polysulphur chloride at a rate such that the temperature was maintained below 35° C.

The reaction was allowed to continue until a negative test was obtained with potassium iodide. To the resulting mixture was added 30 gms. of aluminium amalgam and 200 mls. of tetrahydrofurane and 50 mls. of water. The reaction was allowed to continue until the solution became colourless. After this time, the suspension was filtered and the residue washed with diethyl ether which was then combined with the organic filtrates. The combined filtrates were dried over magnesium sulphate and distilled under reduced pressure to yield 21.4 gms. of allyl acetate episulphide having a boiling point of 63.5–66.0° C. at 6 millimeters of mercury pressure, and a refractive index $n_D^{20}$=1.4822.

An elemental analysis of this episulphide showed carbon=45.72%, hydrogen=6.22% and sulphur=24.06% as compared with the calculated amounts of carbon=45.46%, hydrogen=6.1% and sulphur=24.26%.

EXAMPLE VIII

This example illustrates the reduction of a polysulphur chloride addition product with 3-cyclohexene-1-carbonitrile. This addition product was prepared by adding 67 gms. of a polysulphur chloride over a period of 2 hours to 80 gms. of 3-cyclohexene-1-carbonitrile in a 500 mls. flask. The mixture was stirred for 5 hours at room temperature.

A solution of 95 gms. of the addition product of 3-cyclohexene-1-carbonitrile and polysulphur chloride in 500 mls, of tetrahydrofurane was reduced with 30 gms. of aluminium amalgam and 75 mls, of water as in Example VII. The suspension was filtered and the filtrated distilled in a molecular still to give 35 gms. of 3-cyclohexene-1-carbonitrile episulphide, which was purified by fractionation in a molecular still and identified by its infrared spectrum:

| | |
|---|---|
| 2920 (s.) | 1378 (m.) |
| 2240 (s.) | 1105 (m.) |
| 1440 (s.) | 1005 (m.) |

EXAMPLE IX

This example illustrates the reduction of a polysulphur chloride addition product of dihydrothiophene.

Into a two-litre, three-necked flask equipped with stirrer, condenser and dropping funnel, there was placed 100 gms. of the addition product of dihydrothiophene and a polysulphur chloride compound. This was dissolved in 1500 mls. of tetrahydrofurane and reduced by the action of 50 gms. of aluminium amalgam and 100 mls. of water. The water was added in small portions, with stirring and external cooling, at such a rate as to maintain the internal temperature of the mixture at about 40° C.

When the reduction was complete, the suspension was filtered and the volatile portions were distilled off at a reduced pressure, to yield 46.7 gms. of a residue. This residue was distilled to give 26.3 gms., of the episulphide of boiling point 41° C.–45° C. at 0.1 millimeter of mercury pressure.

The episulphide was identified by desulphurization to 2,5-dihydrothiophene using triphenyl phosphine and by its nuclear magnetic resonance spectrum whch shows 2 protons at 3.29 p.p.m. and 4 protons at 3.04 p.p.m., and by its infra-red absorption spectra in carbon disulphide which shows the following absorbances (cm.$^{-1}$):

| | |
|---|---|
| 3000 (m.) | 2890 (s.) |
| 2950 (m.) | 2820 (m.) | and the additional absorbances when an undiluted sample is used:

| | |
|---|---|
| 1430 (s.) | 782 (m.) |
| 1130 (m.) | 1218 (w.) |
| 852 (s.) | 962 (s.) |
| 1325 (s.) | 715 (s.) |
| 1104 (w.) | 1148 (s.) |
| 840 (m.) | 927 (s.) |
| 1272 (s.) | 602 (vs.) |
| 1042 (s.) | |

EXAMPLE X

This example illustrates the reduction of the addition product of 1,4-dichloro-2-butene and sulphur monochloride.

To a solution of 275 gms. (0.95 mole) of the addition product of 1,4-dichloro-2-butene and sulphur monochloride, there was added 1 litre of diethyl ether, 50 gms. of aluminium amalgam and 125 gms. of water. The water was added at such a rate that a smooth refluxing of the mixture was maintained. After the reduction was complete, the suspension was stirred for a further five hours and filtered, and the residue was washed with diethyl ether. The combined organic filtrates were dried over magnesium sulphate and distilled to give 55 gms. of the episulphide of boiling point 52° C.–54° C. at 1–3 millimeters of mercury pressure.

The composition of the episulphide was found to be: carbon=30.6% and hydrogen=3.82% as compared with the calculated carbon=31.2% and hydrogen=3.90%. The episulphide was identified by its desulphurization, using triphenyl phosphine, to 1-4 dichloro 2-butene.

EXAMPLE XI

This example illustrates the preparation of 3-ethoxy propylene episulphide.

The addition product of 86.1 gms. of 3-ethoxy propylene and 125 gms. of a polysulphur chloride compound was reduced by 30 gms. of aluminium amalgam in moist tetrahydrofurane. The organic solution was dried over magnesium sulphate and distilled to yield 40.2 gms. of 3-ethoxy propylene episulphide having a boiling point of 53° C. at 17 millimeters of mercury pressure and a refractive index $n_D^{20}=1.4749$. The composition analysis of this product was found to be carbon=50.4%, hydrogen=8.5% and sulphur=27.3% as compared with the calculated carbon=50.8%, hydrogen=8.4% and sulphur=27.1%.

EXAMPLE XII

This example illustrates the reduction of the polysulphur chloride/chloromethyl norborene addition product.

To 125 gms. of the addition product dissolved in 800 mls. of tetrahydrofurane there were added 35 gms. of aluminum amalgam and 100 mls. of water. When the reduction was complete, the suspension was filtered and the filtrate distilled to give the sulphide having the following infra-red spectrum (cm.$^{-1}$):

| | |
|---|---|
| 2950 (s.) | 1303 (s.) |
| 1061 (s.) | 766 (s.) |
| 1450 (s.) | 1074 (s.) |
| 934 (s.) | 738 (s.) |
| 1357 (m.) | 715 (s.) |
| 778 (s.) | |

EXAMPLE XIII

This example illustrates the reduction of the allyl chloride/sulfur monochloride addition product using a mixture of sodium sulphide and sodium sulphite.

A mixture of 15 gms. of the allyl chloride/sulphur monochloride addition product, 25 gms. of sodium sulphide and 25 gms. of sodium sulphite was placed in a flask equipped with a mechanical stirrer and a distillation head. The flask was evacuated to a pressure of 2–4 millimeters of mercury and was heated in an oil bath to a temperature of from 70° C. to 100° C. for five hours. The stirrer was stopped very shortly after the heating was started due to caking of the mixture on the sides of the flask. At the end of the five hours a Dry Ice/acetone cooled collecting flask, placed at the end of the distillation head was found to contain 3.9 gms. of 3-chlorophylene episulphide of refractive index $n_D^{20}=1.5240$. The product was identified by its infra-red spectrum.

EXAMPLE XIV

This example illustrates the preparation of 2,5-dihydro thiophene episulphides by reduction of the polysulphur chloride/2,5-dihydro thiophene addition product, using a sodium sulphide/sodium sulphite mixture.

A mixture of 20 gms. (0.072 mole) of dihydro thiophene/polysulphur chloride addition product, 40 gms. (0.31 mole) of sodium sulphide and 40 gms. (0.31 mole) of sodium sulphite was heated, with stirring, to 35° C. at a pressure of 5–6 millimeters of mercury. The temperature was raised gradually to 100° C. over a period of 4 hours, and at the end of this period a mixture of water and an oil had collected in a Dry Ice/acetone cooled trap connected to the reaction flask. The oil (2 gms.) was separated from the water and identified to be 2,5-dihydro thiophene episulphide.

After having now described my invention, what I claim is:

1. A process for the preparation of monomeric substituted vicinal episulphides comprising reducing a chloropolysulphide being the reaction product of the olefine having a substituent containing at least one atom other than carbon and hydrogen with a sulphur chloride compound having a mol ratio of sulphur to chlorine of at least 0.5:1, using a non-acidic reducing system selected from the group consisting of aluminum amalgam and water, nascent hydrogen, lithium aluminum hydride, glucose in a basic medium, Group I–A metal sulphides and sodium sulphite.

2. A proces according to claim 1 in which the non-acidic reducing system is Group I–A metal sulphide and sodium sulphite.

3. A process according to claim 1 in which the non-acidic reducing system is aluminum amalgam and water.

4. A process according to claim 1 in which reduction is effected by nascent hydrogen.

5. A process according to claim 1 in which the non-acidic reducing system is lithium aluminum hydride.

6. A process according to claim 1 in which the non-acidic reducing system is glucose in a basic medium.

7. A process according to claim 1 in which the non-acidic reducing system is sodium sulphide.

8. A process according to claim 3 in which the chloropolysulphide is added to a suspension of the aluminum amalgam in diethyl ether, and water is added to the mixture.

9. A process according to claim 8 in which the water is added dropwise at such a rate that smooth reflexing of the mixture is maintained.

10. A process according to claim 8 in which the water is added dropwise until all the aluminum amalgam has reacted with the water.

11. A process according to claim 3 in which the amount of the aluminum amalgam is from 10 percent to 25 percent by weight based on the weight of the chloropolysulphide to be reduced.

12. A process according to claim 8 in which the amount of the diethyl ether is from 5 mls. to 50 mls. per gramme of aluminum amalgam.

13. A process according to claim 14 in which said molar ratio is from 2:1 to 6:1.

14. A process according to claim 1 in which the non-acidic reducing system is a Group I–A metal sulphide in an amount such that the molar ratio of the metal sulphide to the chloropolysulphide is from 1:1 to 8:1.

15. A process according to claim 1 in which said monomeric compound is separated from the reaction product, and is also purified, by distillation under reduced pressure.

References Cited

UNITED STATES PATENTS

| | | | |
|---|---|---|---|
| 2,225,573 | 12/1940 | Tendeloo et al. | 167—33 |
| 2,513,060 | 6/1950 | Smith et al. | 252—48.6 |
| 2,870,163 | 1/1959 | Davis et al. | 260—327 |

JAMES A. PATTEN, *Primary Examiner.*

Disclaimer 3,403,166.—*Friedrich K. Lautenschlaeger*, Toronto, Ontario, Canada. EPISULFIDE PRODUCTION. Patent dated Sept. 24, 1968. Disclaimer filed Aug. 15, 1969, by the assignee, *The Dunlop Company Limited*.

Hereby disclaims the terminal portion of the term of the patent subsequent to Aug. 6, 1985.

[*Official Gazette December 9, 1969.*]